United States Patent
Tamaru et al.

(10) Patent No.: US 7,400,355 B2
(45) Date of Patent: Jul. 15, 2008

(54) IMAGE PICKUP APPARATUS AND PHOTOMETER

(75) Inventors: Masaya Tamaru, Asaka (JP); Masahiko Sugimoto, Asaka (JP); Koichi Sakamoto, Asaka (JP); Manabu Hyodo, Asaka (JP); Kazuhiko Takemura, Asaka (JP); Koji Ichikawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 686 days.

(21) Appl. No.: 10/618,699

(22) Filed: Jul. 15, 2003

(65) Prior Publication Data

US 2004/0012711 A1 Jan. 22, 2004

(30) Foreign Application Priority Data

Jul. 15, 2002 (JP) ............... P.2002-205605

(51) Int. Cl.
*H04N 5/238* (2006.01)

(52) U.S. Cl. ........... 348/364; 348/222.1; 348/229.1; 348/254; 348/297; 348/367

(58) Field of Classification Search ......... 348/221.1, 348/229.1, 254, 275, 315, 362, 364, 367, 348/222.1, 296, 297
See application file for complete search history.

(56) References Cited

U.S. PATENT DOCUMENTS

| | | | |
|---|---|---|---|
| 4,706,123 A * | 11/1987 | Chautemps | 348/297 |
| 4,819,074 A * | 4/1989 | Suzuki | 348/298 |
| 5,036,400 A | 7/1991 | Haruki | |
| 5,065,247 A | 11/1991 | Haruki | |
| 5,079,622 A | 1/1992 | Toshinobu | |
| 5,264,940 A * | 11/1993 | Komiya et al. | 348/298 |
| 5,416,515 A | 5/1995 | Arai et al. | |
| 5,420,635 A * | 5/1995 | Konishi et al. | 348/362 |
| 5,714,753 A * | 2/1998 | Park | 250/208.1 |
| 5,929,908 A * | 7/1999 | Takahashi et al. | 348/364 |
| 6,211,915 B1 * | 4/2001 | Harada | 348/298 |
| 6,219,097 B1 * | 4/2001 | Kamishima et al. | 348/297 |
| 6,593,970 B1 * | 7/2003 | Serizawa et al. | 348/362 |
| 6,670,993 B1 * | 12/2003 | Yamamoto et al. | 348/362 |

(Continued)

FOREIGN PATENT DOCUMENTS

JP 62-147872 A 7/1987

(Continued)

OTHER PUBLICATIONS

Y. Wang et al., A High Dynamic Range CMOS APS Image Sensor, 2001 IEEE Workshop, Jun. 7-9, 2001.*

*Primary Examiner*—Tuan Ho
*Assistant Examiner*—Chriss S Yoder, III
(74) *Attorney, Agent, or Firm*—Birch, Stewart, Kolasch & Birch, LLP

(57) ABSTRACT

A received light quantity detection device where high-sensitivity pixels and low-sensitivity pixels are formed is used for photometry. It is possible to perform measurement over the low range (for example, 0[EV] through 8[EV] with a single occasion of photometry. In the case that both the high-sensitivity pixels and the low-sensitivity pixels are saturated, it is possible to perform further measurement over the high range (for example, 8[EV] through 16[EV]) by narrowing the aperture or increasing the electronic shutter speed for retried photometry with a retried photometry. This reduces the time required to calculate a correct exposure value on image pickup apparatus such as a camera.

6 Claims, 5 Drawing Sheets

U.S. PATENT DOCUMENTS

| | | | |
|---|---|---|---|
| 6,765,611 B1 * | 7/2004 | Gallagher et al. | 348/222.1 |
| 6,771,312 B2 * | 8/2004 | Kamishima et al. | 348/229.1 |
| 6,809,768 B1 * | 10/2004 | Merrill | 348/308 |
| 6,831,692 B1 * | 12/2004 | Oda | 348/315 |
| 6,839,087 B1 * | 1/2005 | Sato | 348/362 |
| 6,859,230 B2 * | 2/2005 | Luo et al. | 348/297 |
| 6,873,442 B1 * | 3/2005 | Gindele et al. | 358/471 |
| 6,909,461 B1 * | 6/2005 | Gallagher et al. | 348/294 |
| 6,924,841 B2 * | 8/2005 | Jones | 348/294 |
| 6,970,195 B1 * | 11/2005 | Bidermann et al. | 348/308 |
| 7,024,108 B2 * | 4/2006 | Takahashi | 396/234 |
| 2002/0027189 A1 * | 3/2002 | Murakami et al. | 250/208.1 |
| 2003/0001962 A1 * | 1/2003 | Sakurai | 348/362 |
| 2003/0184659 A1 * | 10/2003 | Skow | 348/223.1 |
| 2004/0017498 A1 * | 1/2004 | Yamashita et al. | 348/315 |

FOREIGN PATENT DOCUMENTS

| | | |
|---|---|---|
| JP | 1-218178 A | 8/1989 |
| JP | 6-189187 A | 7/1994 |
| JP | 2000-125209 A | 4/2000 |
| JP | 2000-316163 A | 11/2000 |
| JP | 2002-57939 A | 2/2002 |

\* cited by examiner

IMAGE PICKUP APPARATUS AND PHOTOMETER

BACKGROUND OF THE INVENTION

1. Field of the Invention

The present invention relates to image pickup apparatus such as a camera and a photometer, and in particular to image pickup apparatus and a photometer which can perform photometry with a wide dynamic range.

2. Description of the Related Art

A photometer described in JP-A-6-130462 is known as a related art, which is mounted on image pickup apparatus such as a digital still camera. The conventional photometer alternately performs photometry where the charge storage time of photoreceptors such as CCDs is longer (that is, photometry which focuses on low intensity of light) and photometry where the charge storage time of a photoreceptor is shorter (photometry which focuses on high intensity of light) so as to allow photometry with a wide dynamic range.

The conventional photometer alternately performs the high-intensity-oriented photometry and the low-intensity-oriented photometry to allow photometry with a wide dynamic range. However, there is a problem that it takes time to determine an exposure value after the release button is touched (depressed lightly), since the photometer frequently changes the charge storage time to perform photometry.

SUMMARY OF THE INVENTION

An object of the invention is to provide image pickup apparatus and a photometer which can perform photometry with a wide dynamic range in a brief period of time while reducing the number of repetitions of photometry.

The invention provides an image pickup apparatus having a solid-state image pickup device where high-sensitivity pixels and low-sensitivity pixels are formed, control means for calculating an exposure value based on values of signal detected by the high-sensitivity pixels and values of a signal detected by the low-sensitivity pixels, which are output from the solid-state image pickup device, and signal processing means for reading data of an image picked up by the solid-state image pickup device and processing according to the exposure value.

With this configuration, it is possible to obtain photometry data which are picked up with various detection sensitivities with a single occasion of photometry. Even when the high-sensitivity pixels are saturated and photometry data is unavailable from the high-sensitivity pixels, photometry data from the low-sensitivity pixels is available as long as the low-sensitivity pixels remain unsaturated. This allows calculation of a correct exposure value in a brief period of time.

The invention also provides an image pickup apparatus having image pickup means for picking up a subject image, received light quantity detecting means where high-sensitivity pixels and low-sensitivity pixels are formed, and control means for calculating an exposure value based on signal showing received light quantity detected by the high-sensitivity pixels and signal showing received light quantity detected by the low-sensitivity pixels, which are output from the received light quantity detecting means, and controlling the image pickup means to pick up a subject image according to the exposure value.

With this configuration, it is also possible to obtain photometry data which are picked up with various detection sensitivities with a single occasion of photometry. Even when the high-sensitivity pixels are saturated and photometry data is unavailable from the high-sensitivity pixels, photometry data from the low-sensitivity pixels is available as long as the low-sensitivity pixels remain unsaturated. This allows calculation of a correct exposure value in a brief period of time.

The invention also provides a photometer which calculates a exposure value of the image pickup apparatus having received light quantity detecting means where high-sensitivity pixels and low-sensitivity pixels are mounted, and calculating means for calculating the exposure value based on signal showing received light quantity detected by the high-sensitivity pixels and signal showing received light quantity detected by the low-sensitivity pixels, which are output from the received light quantity detecting means.

With this configuration, it is also possible to obtain photometry data which are picked up with various detection sensitivities with a single occasion of photometry. Even when the high-sensitivity pixels are saturated and photometry data is unavailable from the high-sensitivity pixels, photometry data from the low-sensitivity pixels is available as long as the low-sensitivity pixels remain unsaturated. This allows calculation of a correct exposure value in a brief period of time.

DETAILED DESCRIPTION OF THE PREFERRED EMBODIMENTS

Embodiments of the invention will be described referring to drawings.

Figure 1:
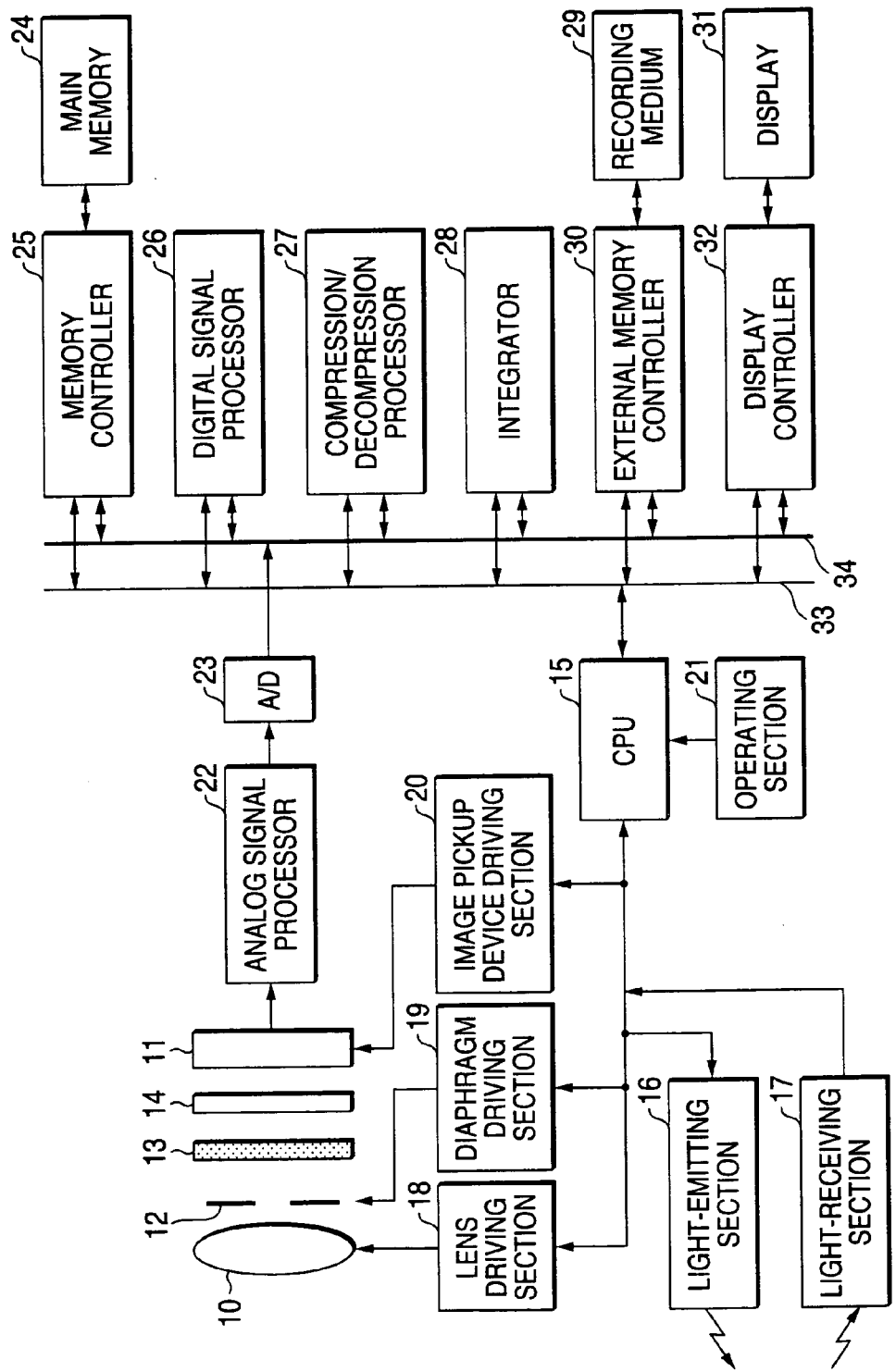
FIG. 1 is a block diagram of a digital still camera according to an embodiment of the invention.

FIG. 1 is a block diagram of a digital still camera according to an embodiment of the invention. The digital still camera has an image pickup lens 10, a solid-state image pickup device 11, a diaphragm 12 provided between the image pickup lens 10 and the solid-state image pickup device 11, an infrared filter 13, an optical low-pass filter 14, a CPU 15 for controlling the entire digital still camera, a light-receiving section 17 and a light-emitting section 16 for a flashlight, a lens driving section 18 for adjusting the position of the image pickup lens 10, a diaphragm driving section 19 for adjusting the diaphragm 12, an image pickup device driving section 20 for operating the solid-state image pickup device 11, an analog signal processor 22 for performing analog signal processing after capturing an output signal of the solid-state image pickup device 11, and an A/D converter 23 for converting an output signal of the analog signal processor 22 to a digital signal.

The CPU 15 controls the lens driving section 18 to position the image pickup lens 10 at a focal position. The CPU 15 further drives and controls the solid-state image pickup device 11 by controlling the image pickup device driving section 20. As a result, the solid-state image pickup device 11 outputs a chrominance signal of a subject image picked up through the image pickup lens 10. An instruction signal by a user is input to the CPU 15 via an operating section 21. The CPU 15 performs various types of control in accordance with the instruction. The solid-state image pickup device 11 is a CCD where honeycomb-shaped pixels are arranged, a Bayer type CCD, or a CMOS sensor.

The digital processing system of the digital still camera has a memory controller 25 connected to a main memory 24, a digital signal processor 26, a compression/decompression processor 27 for compressing a picked-up image to a JPEG image and decompressing a compressed image, an integrator 28 for totalizing photometry data, an external memory controller 30 to which a detachable recording medium 29 is connected, and a display controller 32 to which an LCD 31 mounted on the rear of a camera is connected. These components are interconnected via a control bus 33 and a data bus 34 and controlled by an instruction from the CPU 15.

The digital signal processor 26, the analog signal processor 22 and the A/D converter 23 shown in FIG. 1 may be respectively mounted on a digital still camera as separate circuits. However, these components are preferably manufactured on the same semiconductor substrate as the solid-state image pickup device 11 by using the LSI manufacturing technology to form single solid-state image pickup apparatus.

The aforementioned digital still camera performs focusing and calculates a correct exposure when a release button (not shown) is touched (depressed lightly) by a user before the release button is depressed far enough and an instruction for picking up an image is input.

When the correct exposure is calculated, the CPU 15 adjusts the electronic shutter speed and the aperture of the diaphragm 12 in a variable way while the release button is depressed lightly, processes the output signal of the solid-state image pickup device 11 obtained while the release button is depressed lightly, and calculates the correct exposure based on the photometry data totalized by the integrator 28 by way of a well-known method. The CPU 15 sets the electronic shutter speed and the aperture of the diaphragm 12 which are based on the correct exposure, picks up an image when the release button is depressed far enough, processes the data of the image, and stores the processed image data onto the recording medium 29.

Figure 2:
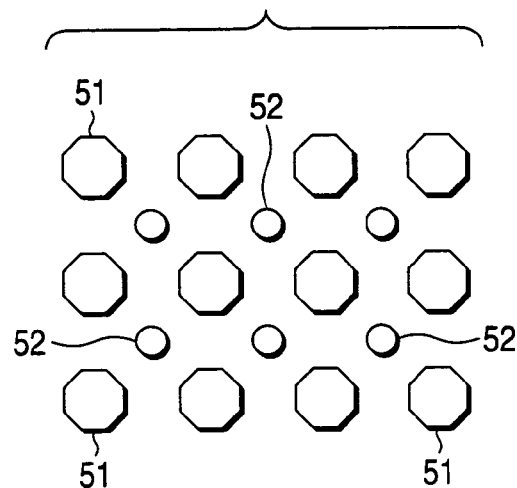
FIG. 2 shows a pixel arrangement of the solid-state image pickup device shown in FIG. 1.

FIG. 2 shows a pixel arrangement of the solid-state image pickup device 11 mounted on the digital still camera according to the embodiment. High-sensitivity pixels 51 shown with a large octagon and low-sensitivity pixels 52 shown with a small circle are formed on the same semiconductor substrate of the solid-state image pickup device 11. As a result, an image picked up with the high-sensitivity pixels 51 and an image picked up with the low-sensitivity pixels 52 are synthesized as a single image to form a single still image with a wide dynamic range.

A large number of photodiodes in the same dimension and shape are formed on the solid-state image pickup device 11. The high-sensitivity pixels 51 and the low-sensitivity pixels 52 are discriminated depending on the size of the area of a micro-lens or a color filter provided in front of each photodiode.

Figure 3:
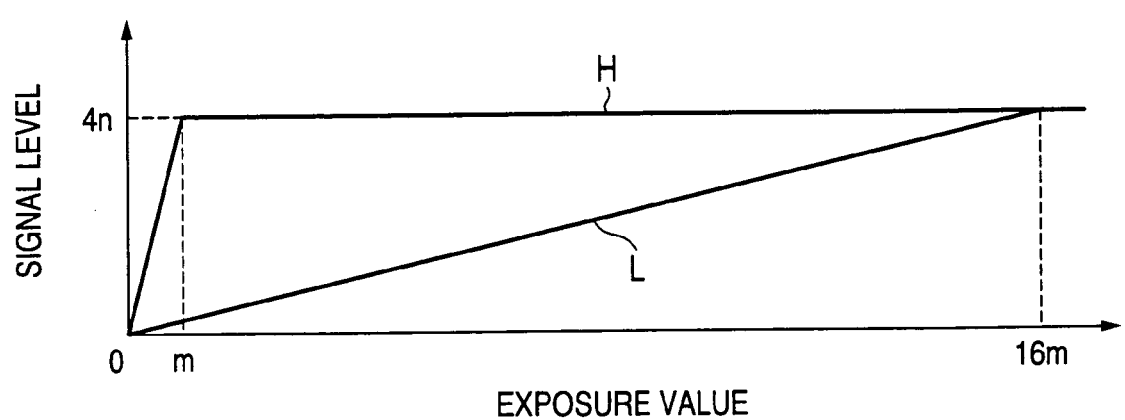
FIG. 3 is a graph showing the relationship between the signal of the solid-state image pickup device shown in FIG. 2 and the exposure.

FIG. 3 shows a general tendency of a signal level with respect to the exposure of each of the high-sensitivity signal H obtained from the high-sensitivity pixels 51 and the low-sensitivity signal L obtained from the low-sensitivity pixels 52. According to the solid-state image pickup device 11 shown in FIG. 2, the high-sensitivity pixels 51 and the low-sensitivity pixels 52 have photodiodes in the same dimension and shape, so that both types of pixels have the same value "4n" of the saturation signal level. However, the light-receiving area is different. The high-sensitivity pixels 51 are saturated with a received light quantity "m" while the low-sensitivity pixels 52 are saturated with a received light quantity "16"m in the example shown.

Figure 4:
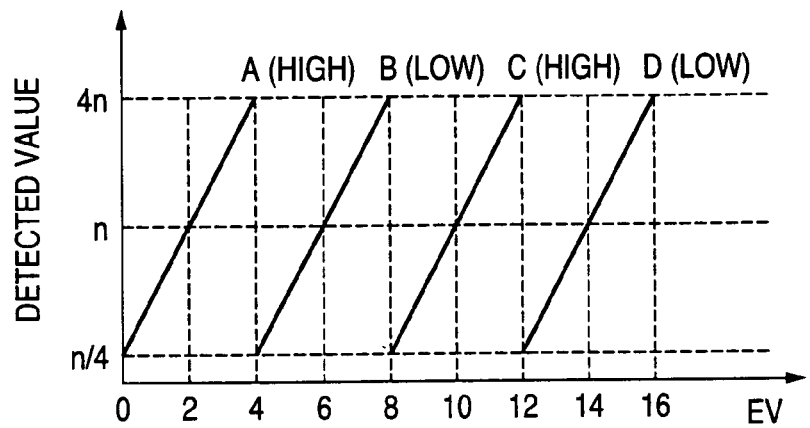
FIG. 4 is a diagram of photometry lines of the solid-state image pickup device shown in FIG. 2.

FIG. 4 is a diagram of photometry lines of the solid-state image pickup device 11 shown in FIG. 2. The vertical axis shows detected values (obtained as an average of values of the signal detected by a large number of pixels) while the horizontal axis shows exposure values (EV).

The photometry line diagram of the high-sensitivity pixels 51 of the solid-state image pickup device 11 shows the characteristic line A, the characteristic line C, while the photometry line diagram of the low-sensitivity pixels 52 shows the characteristic line B, the characteristic line D. It is thus possible to perform a measurement over the range of 0[EV] through 8[EV] using the characteristic line A and the characteristic line B with a single occasion of photometry. In the case that both the high-sensitivity pixels 51 and the low-sensitivity pixels 52 are saturated, it is possible to perform further measurement over the range of 8[EV] through 16[EV] using the characteristic line C and the characteristic line D by narrowing the aperture or increasing the electronic shutter speed with retried photometry.

Figure 5:
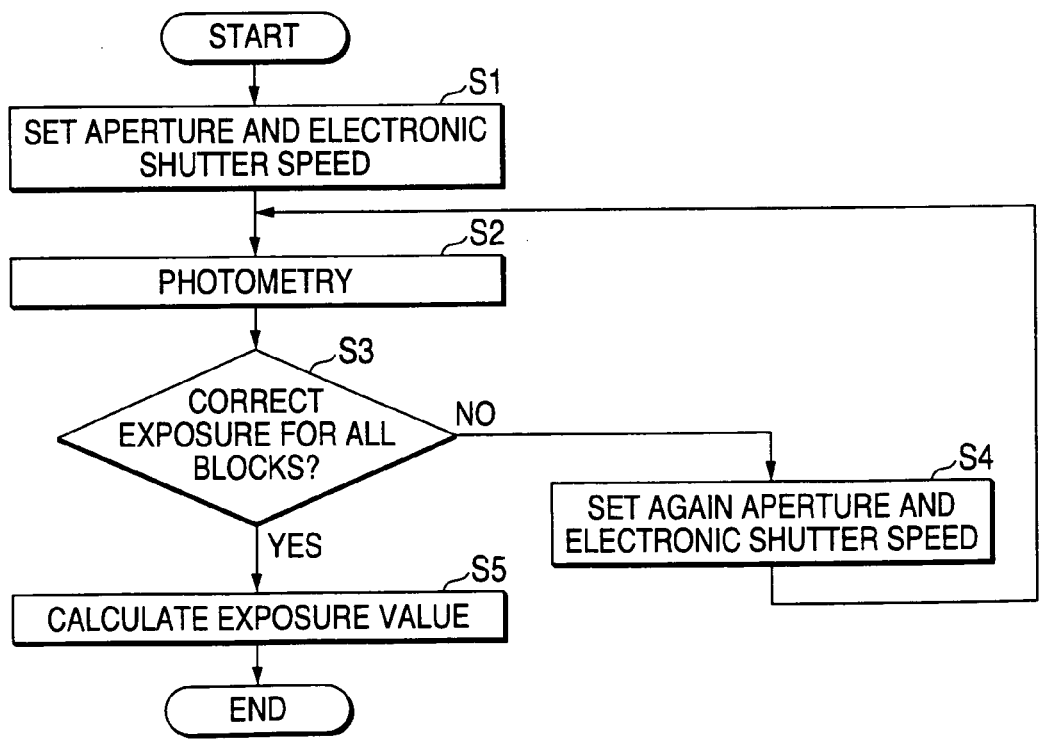
FIG. 5 is a flowchart showing the exposure value calculation processing performed by the CPU shown in FIG. 1.
Figure 6:
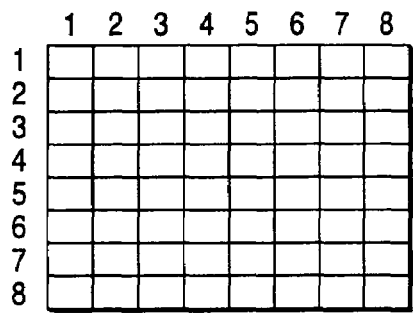
FIG. 6 is a block division diagram showing the photometry areas of the solid-state image pickup device shown in FIG. 1.

FIG. 5 is a flowchart showing the exposure value calculation processing performed by the CPU 15. First, the CPU 15 sets the aperture of the diaphragm 12 and the electronic shutter speed of the solid-state image pickup device 11 (step S1). The CPU 15 then acquires photometry data from the image pickup signal received from the solid-state image pickup device 11 (step S2). The entire exposure surface of the solid-state image pickup device 11 is divided into 8×8=64 blocks and the photometry data is acquired for each of these blocks.

As mentioned earlier, the solid-state image pickup device 11 of the embodiment is equipped with the high-sensitivity pixels 51 and the low-sensitivity pixels 52. Therefore, it is possible to obtain, with single photometry timing, two types of photometry data which are picked up with different sensitivities. Even when the high-sensitivity pixels 51 are saturated and are no longer capable of performing photometry, it is possible to use the photometry data from the low-sensitivity pixels 52 to calculate the exposure.

In step S3, the CPU 15 determines whether or not correct photometry data is obtained for all blocks. In the case that correct data is not obtained for all blocks, execution proceeds to step S4, where the CPU 15 sets the aperture and the electronic shutter speed again, and acquires photometry data from the image pickup signal received from the solid-state image pickup device 11 for a second time (step S2).

In the case that it is determined that, in step S3, correct data is obtained for all blocks, execution proceeds to step S5, where the CPU 15 calculates an exposure value based on the photometry data on all blocks to terminate the exposure value calculation processing.

In this way, the digital still camera of the embodiment obtains, with a single occasion of photometry, two types of photometry data which are picked up with different sensitivities. This reduces the number of repetitions of a series of steps S2, S3, S4 and S2 back again, thus allows calculation of a correct exposure in a brief period of time.

Figure 7:
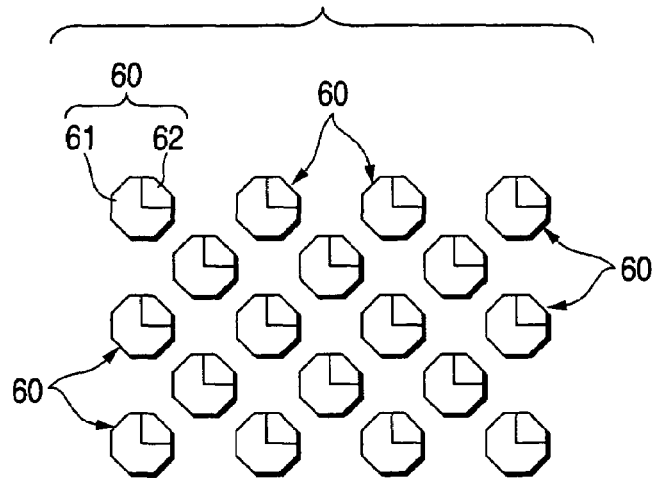
FIG. 7 shows a pixel arrangement of the solid-state image pickup device mounted on a digital still camera according to another embodiment of the invention.

FIG. 7 shows a pixel arrangement of the solid-state image pickup device 11 mounted on a digital still camera of another embodiment. In the solid-state image pickup device of the another embodiment, each pixel 60 is divided into the area for high-sensitivity pixels 61 and the area for low-sensitivity pixels 62. The signal charge of the high-sensitivity pixels 61 and the signal charge of the low-sensitivity pixels 62 are separately read onto a vertical transfer path and transferred thereon.

Figure 8:
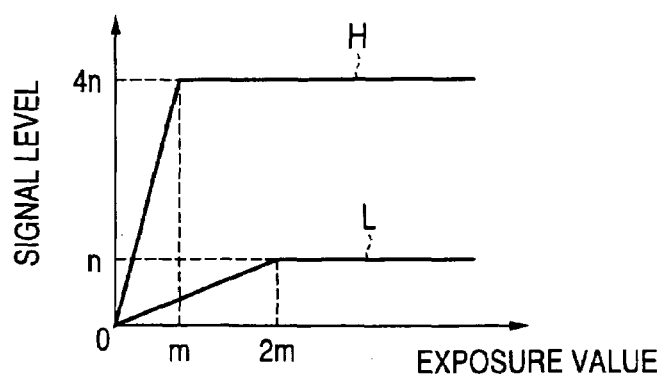
FIG. 8 is a graph showing the relationship between the signal of the solid-state image pickup device shown in FIG. 7 and the exposure.

FIG. 8 shows a general tendency of a signal level with respect to the exposure of each of the high-sensitivity signal H read from the high-sensitivity pixels 61 and the low-sensitivity signal L read from the low-sensitivity pixels 62. In the example shown, the level of saturation of the high-sensitivity signal H is "4n" which is four times as high as the level of saturation of the low-sensitivity signal L which is "n". The light quantity where the signal level reaches the saturation level is "m" for the high-sensitivity pixels 61, while the light quantity "2m" for the low-sensitivity pixels 62, which is double the former "m".

Figure 9:
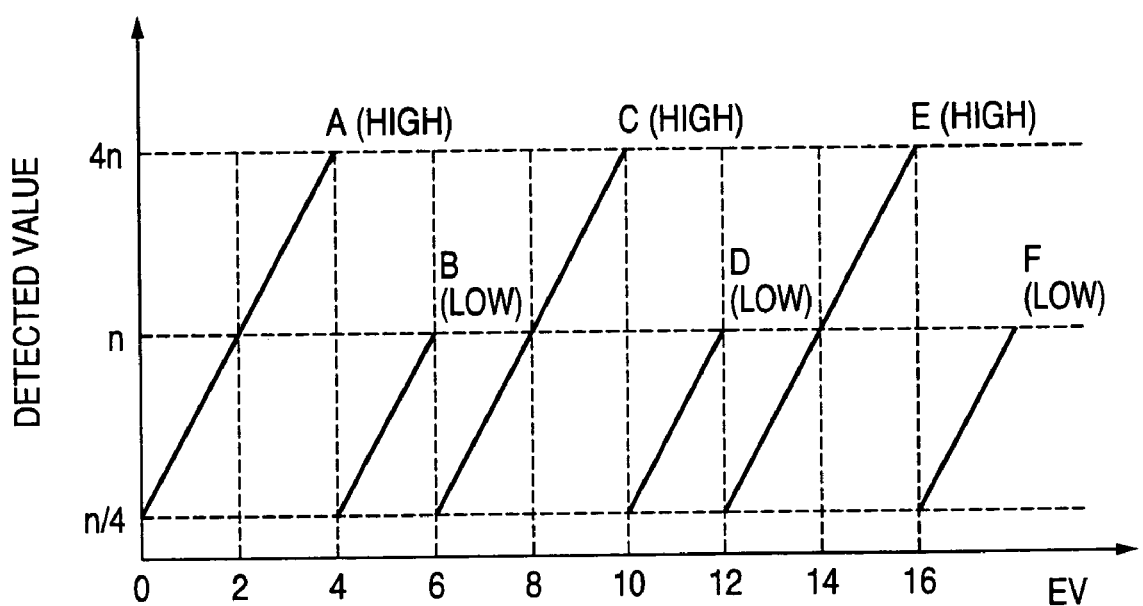
FIG. 9 is a diagram of photometry lines of the solid-state image pickup device shown in FIG. 7.

FIG. 9 is a diagram of photometry lines of the solid-state image pickup device shown in FIG. 7. The vertical axis shows detected values, while the horizontal axis shows exposure values (EV). The photometry line diagram of the high-sensitivity pixels 61 of the solid-state image pickup device according to the embodiment shows the characteristic line A, the characteristic line C, while the photometry line diagram of the low-sensitivity pixels 62 shows the characteristic line B, the characteristic line D. It is possible to perform measurement over the range of 0[EV] through 6[EV] using the characteristic line A and the characteristic line B with a single occasion of photometry. In the case that both the high-sensitivity pixels 61 and the low-sensitivity pixels 62 are saturated, it is possible to perform further measurement over the range of 6 [EV] through 10 [EV] using the characteristic line C and the characteristic line D on a single occasion of photometry by narrowing the aperture or increasing the electronic shutter speed with retried photometry.

The digital still camera where such a solid-state image pickup device is mounted follows the same procedure as mentioned referring to FIG. 5 to perform exposure value calculation processing. In this case also, it is possible to obtain, with a single occasion of photometry, two types of photometry data which are picked up with different sensitivities. This reduces the number of repetitions of photometry, thus allows calculation of a correct exposure in a brief period of time.

While the digital still camera using the output signal of a solid-state image pickup device in photometry has been described in the embodiments, a received light quantity detection device equipped with both high-sensitivity pixels and low-sensitivity pixels may be mounted on image pickup apparatus apart from the solid-state image pickup device so as to obtain photometry data from the output signal of the received light quantity detection device. In this case, the image pickup means is not limited to a solid-state image pickup device but may be a silver halide film camera.

According to the embodiments, both output of high-sensitivity pixels and output of low-sensitivity pixels are used for photometry, so that it is possible to perform photometry with a wide dynamic range in a brief period of time.

What is claimed is:

1. An image pickup apparatus, comprising:
   a solid-state image pickup device having high-sensitivity pixels and low-sensitivity pixels, a photometric characteristic of an output of the high-sensitivity pixels being different from that of the low-sensitivity pixels, wherein
   the high-sensitivity pixels have a first high-sensitivity exposure value ran e in which the function before becoming saturated and a second high-sensitivity exposure value range in which they function before becoming saturated and no exposure value in the first hi-sensitivity exposure value range overlaps with an exposure value in the second high-sensitivity exposure value range,
   the low-sensitivity pixels have a first low-sensitivity exposure value range in which they function before becoming saturated and a second low-sensitivity exposure value ran e in which the function before becoming saturated and no exposure value in the first low-sensitivity exposure value range overlaps with an exposure value in the second low-sensitivity exposure value range,
   the exposure value at which the low-sensitivity pixels be in to function in the first low-sensitivity exposure value range coincides with the exposure value at which the high-sensitivity pixels become saturated in the first high-sensitivity exposure value range, and
   the exposure value at which the low-sensitivity pixels begin to function in the second low-sensitivity exposure value range coincides with the exposure value at which the high-sensitivity pixels become saturated in the second high-sensitivity exposure value range;
   control means for (i) calculating an exposure value based on values of signal detected by said high-sensitivity pixels operating in the first high-sensitivity exposure value range and values of signal detected by said low-sensitivity pixels operating in the first low-sensitivity exposure value range, which are output from said solid-state image pickup device in a first single instance of photometry, and (ii) when a correct exposure value cannot be obtained in the first single instance of photometry due to saturation of both the high-sensitivity pixels and the low-sensitivity pixels, calculating an exposure value based on values of signal detected by said high-sensitivity pixels operating in the second high-sensitivity exposure value range and values of signal detected by said low-sensitivity pixels operating in the second low-sensitivity exposure value range which are output from said solid-state image pickup device in a second subsequent single instance of photometry, where during each of the first and second instance of photometry, aperture and electronic shutter speed are not changed; and
   signal processing means for reading data of an image picked up by said solid-state image pickup device and processing according to the calculated exposure value.

2. The image pickup apparatus of claim 1, wherein each pixel includes a high-sensitivity pixel and a low-sensitivity pixel.

3. An image pickup apparatus, comprising:
   image pickup means for picking up a subject image;
   received light quantity detecting means having high-sensitivity pixels and low-sensitivity pixels, a photometric characteristic of an output of the high-sensitivity pixels being different from that of the low-sensitivity pixels, wherein
   the high-sensitivity pixels have a first high-sensitivity exposure value range in which they function before becoming saturated and a second high-sensitivity exposure value range in which the function before becoming saturated and no exposure value in the first high-sensitivity exposure value range overlaps with an exposure value in the second high-sensitivity exposure value range, the low-sensitivity pixels have a first low-sensitivity exposure value range in which the function before becoming saturated and a second low-sensitivity exposure value range in which they function before becoming saturated and no exposure value in the first low-sensitivity exposure value range overlaps with an exposure value in the second low-sensitivity exposure value range, the exposure value at which the low-sensitivity pixels begin to function in the first low-sensitivity exposure value range coincides with the exposure value at which the high-sensitivity pixels become saturated in the first high-sensitivity exposure value range, and the exposure value at which the low-sensitivity pixels begin to function in the second low-sensitivity exposure value range coincides with the exposure value at which the high-sensitivity pixels become saturated in the second high-sensitivity exposure value range; and control means for (i) calculating an exposure value based on signal showing received light quantity detected by said high-sensitivity pixels operating in the first high-sensitivity exposure value range and signal showing received light quantity detected by said low-sensitivity pixels operating in the first low-sensitivity exposure value range, which are output from said received light quantity detecting means device in a first single instance of photometry, and (ii) when a correct exposure value cannot be obtained in the first single instance of photometry due to saturation of both the high-sensitivity pixels and the low-sensitivity pixels calculating an exposure value based on values of signal detected by said high-sensitivity pixels operating in the second high-sensitivity exposure value range and values of signal detected by said low-sensitivity pixels operating in the second low-sensitivity exposure value range which are output from said solid-state image pickup device in a second subsequent single instance of photometry, and controlling said image pickup means to pick up a subject image according to the exposure value, where during each of the first and second instance of photometry, aperture and electronic shutter speed are not changed.

4. The image pickup apparatus of claim 3, wherein each pixel includes a high-sensitivity pixel and a low-sensitivity pixel.

5. A photometer which calculates a exposure value of the image pickup apparatus, comprising:

received light quantity detecting means having high-sensitivity pixels and low-sensitivity pixels, a photometric characteristic of an output of the high-sensitivity pixels being different from that of the low-sensitivity pixels, wherein the high-sensitivity pixels have a first high-sensitivity exposure value range in which they function before becoming saturated and a second high-sensitivity exposure value range in which they function before becoming saturated and no exposure value in the first high-sensitivity exposure value range overlaps with an exposure value in the second high-sensitivity exposure value range, the low-sensitivity pixels have a first low-sensitivity exposure value range in which they function before becoming saturated and a second low-sensitivity exposure value range in which they function before becoming saturated and no exposure value in the first low-sensitivity exposure value range overlaps with an exposure value in the second low-sensitivity exposure value range, the exposure value at which the low-sensitivity pixels be in to function in the first low-sensitivity exposure value range coincides with the exposure value at which the hi -sensitivity pixels become saturated in the first high-sensitivity exposure value range, and the exposure value at which the low-sensitivity pixels begin to function in the second low-sensitivity exposure value range coincides with the exposure value at which the high-sensitivity pixels become saturated in the second high-sensitivity exposure value range; and calculating means for (i) calculating the exposure value based on signal showing received light quantity detected by said high-sensitivity pixels operating in the first high-sensitivity exposure value range and signal showing received light quantity detected by said low-sensitivity pixels operating in the first low-sensitivity exposure value range, which are output from the received light quantity detecting means device in a first single instance of photometry, and (ii) when a correct exposure value cannot be obtained in the first single instance of photometry due to saturation of both the high-sensitivity pixels and the low-sensitivity pixels, calculating an exposure value based on values of signal detected by said high-sensitivity pixels operating in the second high-sensitivity exposure value range and values of signal detected by said low-sensitivity pixels operating in the second low-sensitivity exposure value range, which are output from said solid-state image pickup device in a second subsequent single instance of photometry, where during each of the first and second instance of photometry, aperture and electronic shutter speed are not changed.

6. The photometer of claim 5, wherein each pixel includes a high-sensitivity pixel and a low-sensitivity pixel.

* * * * *